United States Patent [19]

Ryan et al.

[11] Patent Number: 4,527,238

[45] Date of Patent: Jul. 2, 1985

[54] CACHE WITH INDEPENDENT ADDRESSABLE DATA AND DIRECTORY ARRAYS

[75] Inventors: Charles P. Ryan, Phoenix; Russell W. Guenthner, Glendale; Leonard G. Trubisky, Scottsdale, all of Ariz.

[73] Assignee: Honeywell Information Systems Inc., Phoenix, Ariz.

[21] Appl. No.: 470,353

[22] Filed: Feb. 28, 1983

[51] Int. Cl.³ .............................................. G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,670,309 | 6/1972 | Amdahl et al. | 364/200 |
| 3,840,862 | 10/1974 | Ready | 364/200 |
| 4,195,342 | 3/1980 | Joyce et al. | 364/200 |
| 4,208,716 | 6/1980 | Porter et al. | 364/200 |
| 4,228,503 | 10/1980 | Waite et al. | 364/200 |
| 4,323,968 | 4/1982 | Capozzi | 364/200 |
| 4,371,929 | 2/1983 | Brann et al. | 364/200 |
| 4,378,591 | 3/1983 | Lemay | 364/200 |
| 4,394,733 | 7/1983 | Swenson | 364/200 |
| 4,400,770 | 8/1983 | Chan et al. | 364/200 |
| 4,434,459 | 2/1984 | Holland et al. | 364/200 |

Primary Examiner—James D. Thomas
Assistant Examiner—William G. Niessen
Attorney, Agent, or Firm—A. A. Sapelli; L. J. Marhoefer; J. S. Solakian

[57] ABSTRACT

Cache memory includes a dual or two part cache with one part of the cache being primarily designated for instruction data while the other is primarily designated for operand data, but not exclusively. For a maximum speed of operation, the two parts of the cache are equal in capacity. The two parts of the cache, designated I-Cache and O-Cache, are semi-independent in their operation and include arrangements for effecting synchronized searches, they can accommodate up to three separate operations substantially simultaneously. Each cache unit has a directory and a data array with the directory and data array being separately addressable. Each cache unit may be subjected to a primary and to one or more secondary concurrent uses with the secondary uses prioritized. Data is stored in the cache unit on a so-called store-into basis wherein data obtained from the main memory is operated upon and stored in the cache without returning the operated upon data to the main memory unit until subsequent transactions require such return.

4 Claims, 5 Drawing Figures

CACHE WITH INDEPENDENT ADDRESSABLE DATA AND DIRECTORY ARRAYS

Subject matter described but not claimed herein is shown and claimed in at least one of the following co-pending applications filed on even date herewith:

Ser. No. 470,127 for Cache Memory Structure; Ryan, Guenthner and Trubisky.

Ser. No. 470,126 for Prioritized Secondary Use of a Cache; Ryan and Guenthner.

Ser. No. 470,125 for Verification of Prefetchecd Instructions; Ryan and Guenthner.

BACKGROUND OF THE INVENTION

The present invention relates to a general purpose digital data processing system. More particularly, it relates to an improved cache memory means for such a digital data processing system.

One of the aims of improved computer systems is the enhancement of the data throughput of the system. In fulfillment of this aim, a computer system has been provided in which the central processor unit includes a plurality of execution units which may be actuated for concurrent operation. Such a central processor unit is shown and claimed in the co-pending application of William A. Shelly and Leonard Trubisky, Ser. No. 434,122 filed 10/13/82. It is well known to provide high speed cache memory units for the temporary storage of data for the use of the execution units. To further enhance the throughput of such computer systems, it has been proposed, as in U.S. Pat. No. 3,618,041, to provide a dual cache means wherein the cache memory appears as two separate cache elements or units, one exclusively for instruction data and the other exclusively for operand data. Such a dual cache approach, while providing a measure of improvement, still falls short in optimizing the throughput time of the computer system. The dual cache arrangement of previously disclosed systems do not provide a high degree of versatility in the handling of data for the system.

SUMMARY OF THE INVENTION

It is, accordingly, an object of the present invention to provide an improved cache memory arrangement for a digital data processing system.

It is another object of the present invention to provide an improved cache memory arrangement as set forth which features improved versatility of operation.

It is a further object of the present invention to provide an improved cache memory arrangement as set forth wherein the improved versatility results in improved data handling capacity.

In accomplishing these and other objects, there has been provided in accordance with the present invention, a cache memory arrangement wherein the cache memory includes a dual or two part cache with one part of the cache being primarily designated for instruction data while the other is primarily designated for operand data, but not exclusively. For a maximum speed of operation, the two parts of the cache are equal in capacity. The two parts of the cache, hereinafter designated I-Cache and O-Cache, are semi-independent in their operation and include arrangements for effecting synchronized searches, they can accommodate up to three separate operations substantially simultaneously. Each cache unit has a directory and a data array with the directory and data array being separately addressable. Each cache unit may be subjected to a primary and to one or more secondary concurrent uses with the secondary uses prioritized. Data is stored in the cache unit on a so-called store-into basis wherein data obtained from the main memory is operated upon and stored in the cache without returning the operated upon data to the main memory unit until subsequent transactions require such return.

BRIEF DESCRIPTION OF THE DRAWINGS

A better understanding of the present invention may be had from the following detailed description when read in the light of the accompanying drawings in which.

DETAILED DESCRIPTION

Figure 1:
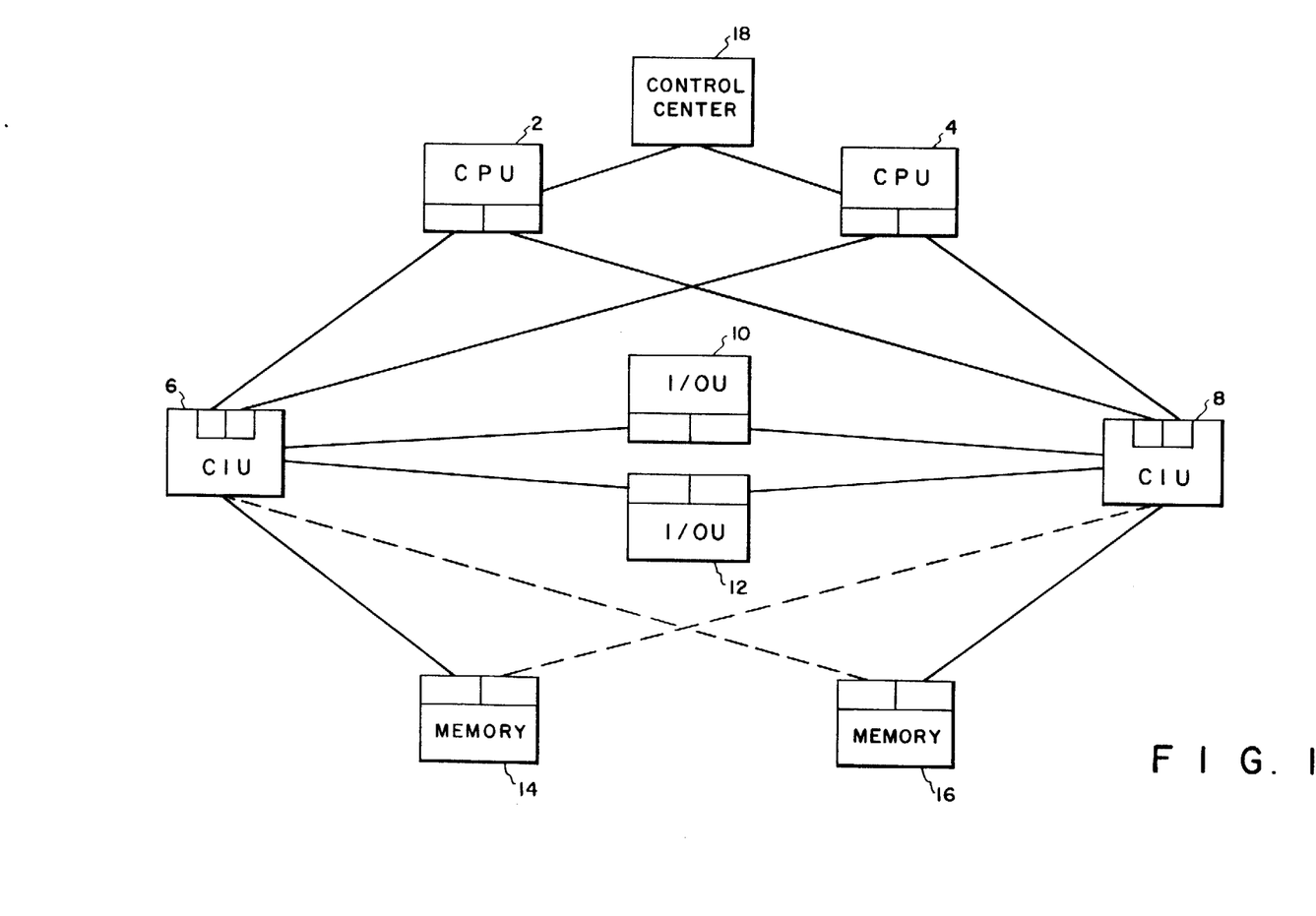
FIG. 1 is a block diagram of a data processing system incorporating the present invention.

Referring now to the drawings in more detail, there is shown in FIG. 1 a computer system of the type hereinbefore referred to. As set forth in a co-pending application of R. C. Moffett, Ser. No. 415,130, the illustrated computer system features a distributed operational characteristic. As shown, the system includes a first central processor unit (CPU) 2 and a second central processor unit (CPU) 4. There is also provided a first central interface unit (CIU) 6 and a second central interface unit (CIU) 8. The first CPU 2 has means for communicating with both the first CIU 6 and the second CIU 8. Similarly, the second CPU 4 has means for communicating with the first CIU 6 and the second CIU 8. One or more input/output units (I/O U) 10 and 12, respectively, are provided. These units basically provide a multiplexed interconnect between the CIUs 6 and 8 and the input/output peripheral units (not shown) of the system. A first memory unit 14 is connected to be associated with the first CIU 6. Similarly, a second memory unit 16 is connected to be associated with the second CIU 8. In such a system the central processor units 2 and 4 perform the usual computational manipulation of data.

Data is received from or transmitted to the input/output unit 10. The central interface units 6 and 8 provide, among other things, a traffic management function between the central processor unit, the input/output units and the associated memory units.

The memory units 14 and 16 provide a storage place for original data as well as data which has been manipulated by the CPUs. In the system herein set forth, it will be noticed that each of the central interface units 6 and 8 may be in direct communication with either of the two central processor units 2 and 4. Both of the central interface units are in communication with the input/output units 10 and 12. Additionally, in the exemplary embodiment of the present invention, each of the two CIUs has the capability of communicating directly with the memory unit associated with the other half of the system. Thus it may be seen that there is an intercommunication capability between the two halves of the illustrated system.

Because of that intercommunication capability, it is necessary that the several components of the system be all synchronized with respect to each other. To this end, there is provided a control center 18. The control center 18 is, in effect, a further CPU whose function is to define the basic control operations for the system, including the synchronization of the operating units.

The structure illustrated in FIG. 1 is set forth for the purpose of illustrating the environment in which the present invention operates.

Figure 2:
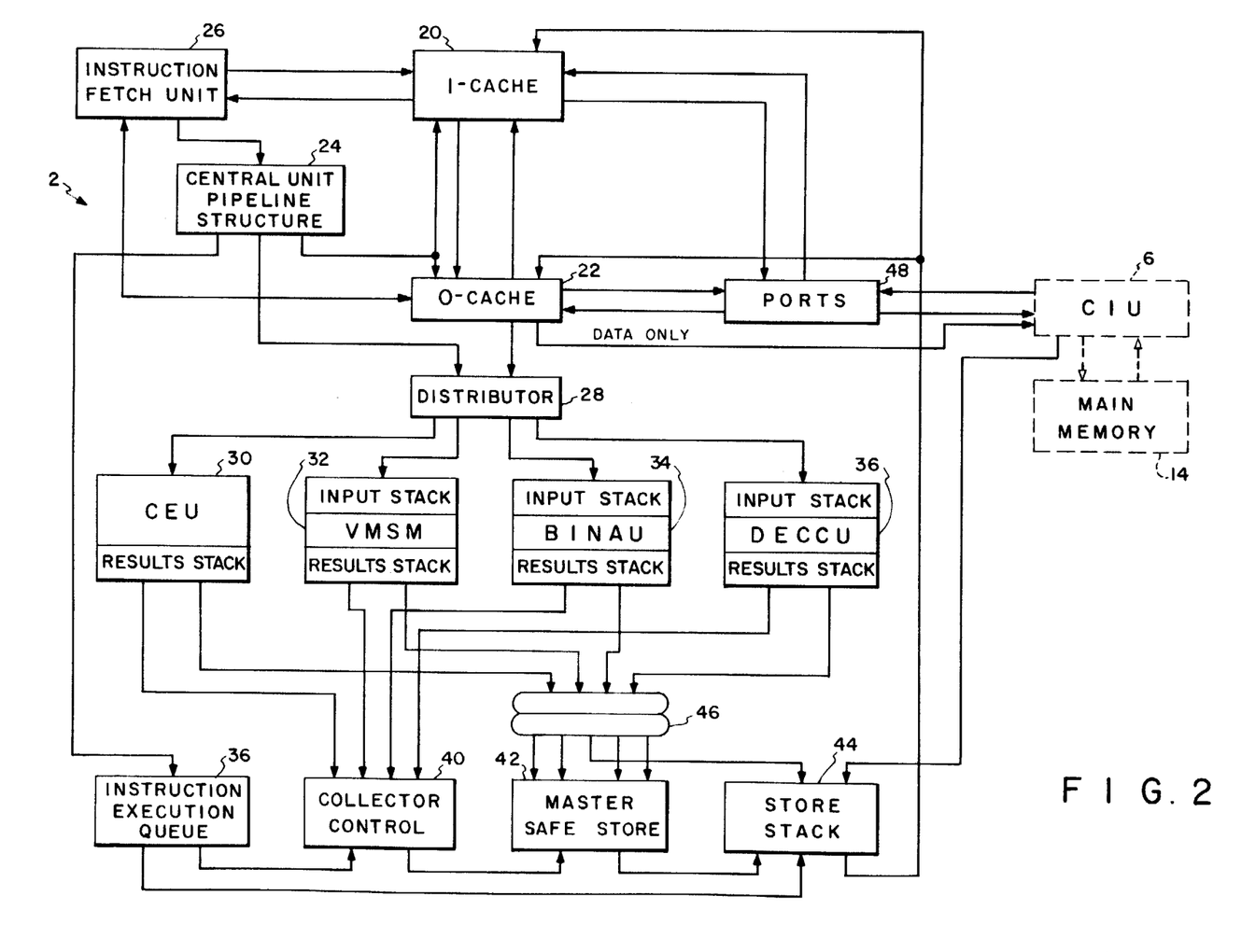
FIG. 2 is a schematic block diagram of a central processor unit forming a part of the system shown in FIG. 1.

In FIG. 2, there are shown the major components, or subsystems, of a CPU such as the CPU 2 shown in FIG. 1; the other CPU 4 is identical in structure. As usual, the CPU 2 includes a cache memory. In the exemplary embodiment illustrated in FIG. 2, that cache memory is illustrated as being in two parts or units, one part being an instruction cache 20 hereinafter identified as an I-cache. The other part of the cache memory is illustrated as being an operand cache 22, hereinafter identified as an O-cache. As is more fully set forth in the aforesaid co-pending application of Shelly and Trubisky, a central unit pipeline structure (CUPS) 24 controls the overall operation of the processor 2. An instruction fetch unit 26 supplies or transmits the address of instruction words to the instruction cache 20 and/or to the operand cache 22. In response to the receipt of an instruction address by the instruction cache from the instruction fetch unit 26, an instruction double word is transmitted from the cache 20 or 22 to the instruction fetch unit 26. The instruction fetch unit 26, in turn, stores or accumulates a series of instructions in an instruction stack which is a part of the instruction fetch unit 26.

The central unit pipeline structure (CUPS) 24 obtains the instructions in program order from the instruction stack of the instruction fetch unit 26. The CUPS unit 24 features a five-stage pipeline which, as is more fully described in the aforementioned co-pending application, as well as in co-pending application of Wilhite and Shelly, Ser. No. 434,196, processes the instructions obtained from the instruction fetch unit 26 and effects a decoding of the operation code and the formation of an operand address. As will be described more fully hereinafter, if the required data is found in the cache memory units, such data is extracted and applied through a distributor 28 to the appropriate one of several execution units.

In the exemplary embodiment of the computer system, the several execution units include first, a central execution unit 30 the architecture of which is particularly adapted to performing basic computer operations, such as simple loads, adds, subtracts, etc. The central execution unit (CEU) 30 is further characterized in that it executes operations on an as-received basis. A second execution unit is identified as a virtual memory and security manager unit (VMSM) 32. This unit executes instructions relating to virtual memory, security and special instructions that are peculiar to a secure operating system. A third execution unit is identified as a binary arithmetic unit (BINAU) 34. The architecture of this unit is particularly oriented towards the execution of binary arithmetic instructions such as multiply, divide and floating point instructions. A fourth execution unit is, in the exemplary embodiment, identified as a decimal/character execution unit (DECCU) 36. This unit is particularly adapted to the execution of decimal arithmetic, alpha numeric and bit string instructions. Each of the execution units 32, 34 and 36 is provided with an input stack for the accumulation and sequential issuing of input instructions and data for the respective execution units. Similarly, each of the execution units 30, 32, 34 and 36 is provided with a results stack for the accumulation and sequential issuance of the result of the execution in the respective execution units. An instruction execution queue 38, under control of the central unit pipeline structure 24 stores execution queue words in program order. A collector control unit 40 uses the instruction execution queue words to control the order of reading out of the resultant data in the result stack of each of the execution units 30, 32, 34 and 36. These execution results may, under such control, be stored either in the master safe store unit 42 or the store stack unit 44, through the operation of a selector switch arrangement 46.

All of the foregoing has been premised on the finding of the required data in the cache structure 20 or 22. In the event that the required data is not found in the cache units, the main memory 14 is accessed through the CIU 6 in order to obtain the required data. The CIU 6 is, in turn, accesed by the cache units 20 or 22 through a PORTS unit 48. When so obtained the data is stored in the cache structure. The operation of the CPU then proceeds as hereinbefore set forth. When the selected data has been acted upon by the appropriate one or more of the execution units, the data is restored to the cache structures by the store stack 44.

Figure 3:
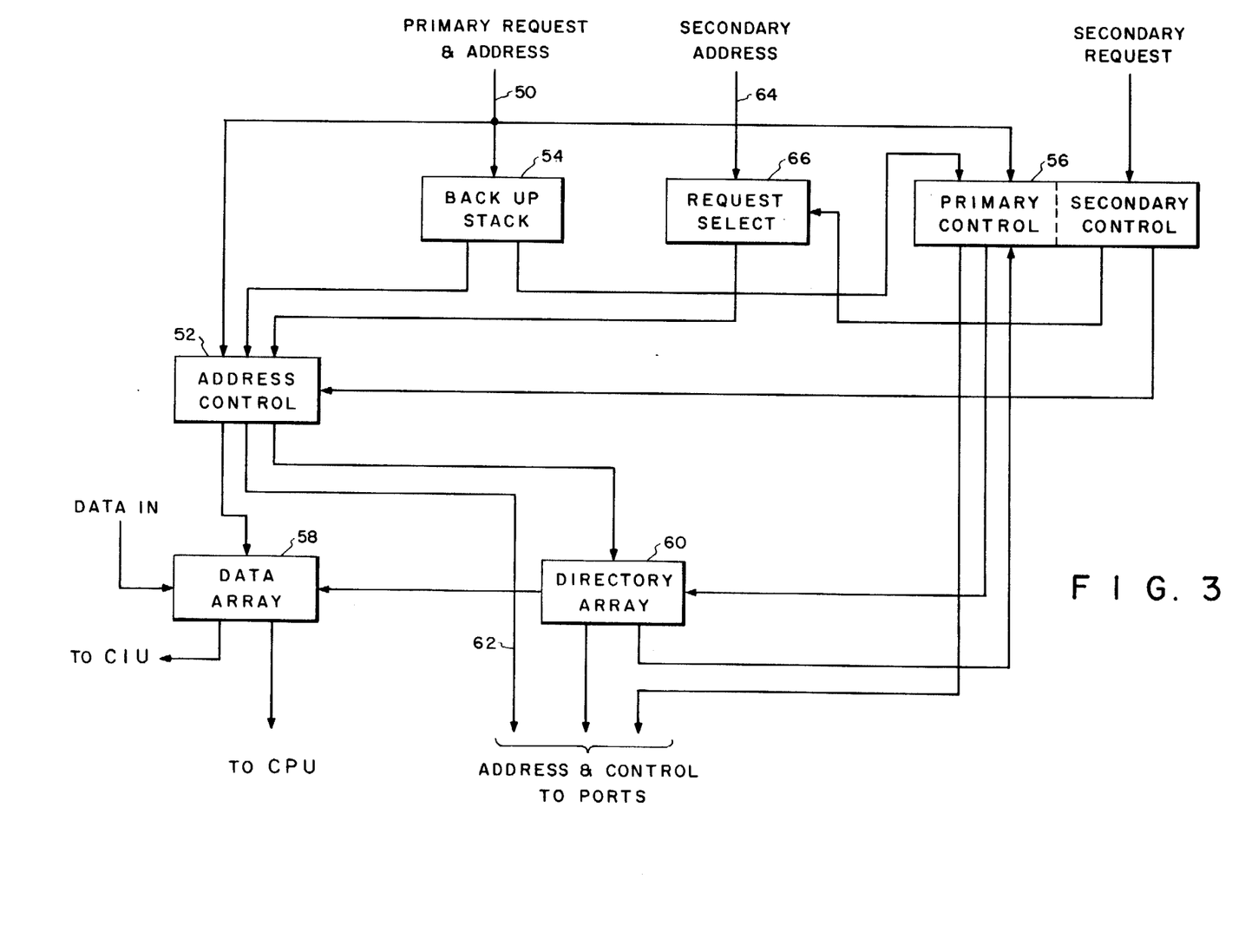
FIG. 3 is a block diagram of a cache memory unit made in accordance with the present invention.

In FIG. 3 there is illustrated in block diagram form the components or subsystems of each of the two cache memory units illustrated in FIG. 2. Primary request and address information is supplied to the input connection 50. The connection 50, in turn, supplies the information as needed to an address control unit 52, a backup stack unit 54, and a primary control portion of a main control arrangement 56. The primary control portion of the control arrangement 56 effects the necessary timing functions for the operations of the cache memory elements. The address control unit 52 also serves in the capacity of controlling the timing of the signal operations within the cache structure and effects a preliminary distribution of the signals to the appropriate functioning elements. For example, the primary address information is channeled by operation of the address control unit 52 to a data array 58, to a directory array 60 and by means of a connection 62 to the ports unit 48 of the CPU.

The data array 58 is a memory array having, in the exemplary embodiment, a capacity for 8,192 words each. These are arranged into four columns or levels each of a nominal 1K × 80 bits (or two forty bit words). This structure will be more fully described hereinafter. The directory array 60 is similarly formed in four levels each having 256 18-bit words. This structure will also be more fully described hereinafter.

When data is retrieved from the main memory for storage in the cache memory unit, it is retrieved in eight word blocks. Since each level of the data array is two words in width, the eight word block occupies four consecutive rows of the selected level of the data array. Thus, each level of the data array may contain up to 256 eight word blocks. Each level of the directory array has the capacity for 256 eighteen bit words. The 256 words of each level of the directory array are paired with the 256 eight word blocks stored in the corresponding level of the data array 58. The ports unit 48 of the CPU includes, among other elements, a duplicate of the directory 60. To that end, the address control unit 52 also delivers address information by way of the connection 62 to the ports unit 48. Similarly, the directory array 60 also has a communication link with the ports unit 48.

Data read out of the data array 58 may be supplied as indicated in FIG. 2 through a distributor 28 to any one of the execution units of the CPU. Similarly, data read out from the data array 58 may also be supplied directly to the CIU 6.

As previously noted, more than one activity may be transacted in the cache substantially simultaneously. To that end, secondary requests and addresses are applied to the cache memory. The secondary address may be applied by way of an input 64, representative of one of several sources of secondary address information, as will be shown hereinafter. That secondary address is applied to a request select unit 66. The secondary requests are applied through an input 68, representative of one or more of several sources of such request signals, to the input of a secondary control portion of the main control unit 56. The secondary control portion of the unit 56 applies a control signal to control the operation of the request select unit 66 and a further control signal to the address control unit 52. These signals control the time and selection operation of the respective units. The output of the request select unit 66 applies the secondary address information to a further input of the address control unit 52. These are, in turn, selectively applied to the directory array 60 and/or the data array 58 for the appropriate processing thereby.

Figure 4A:
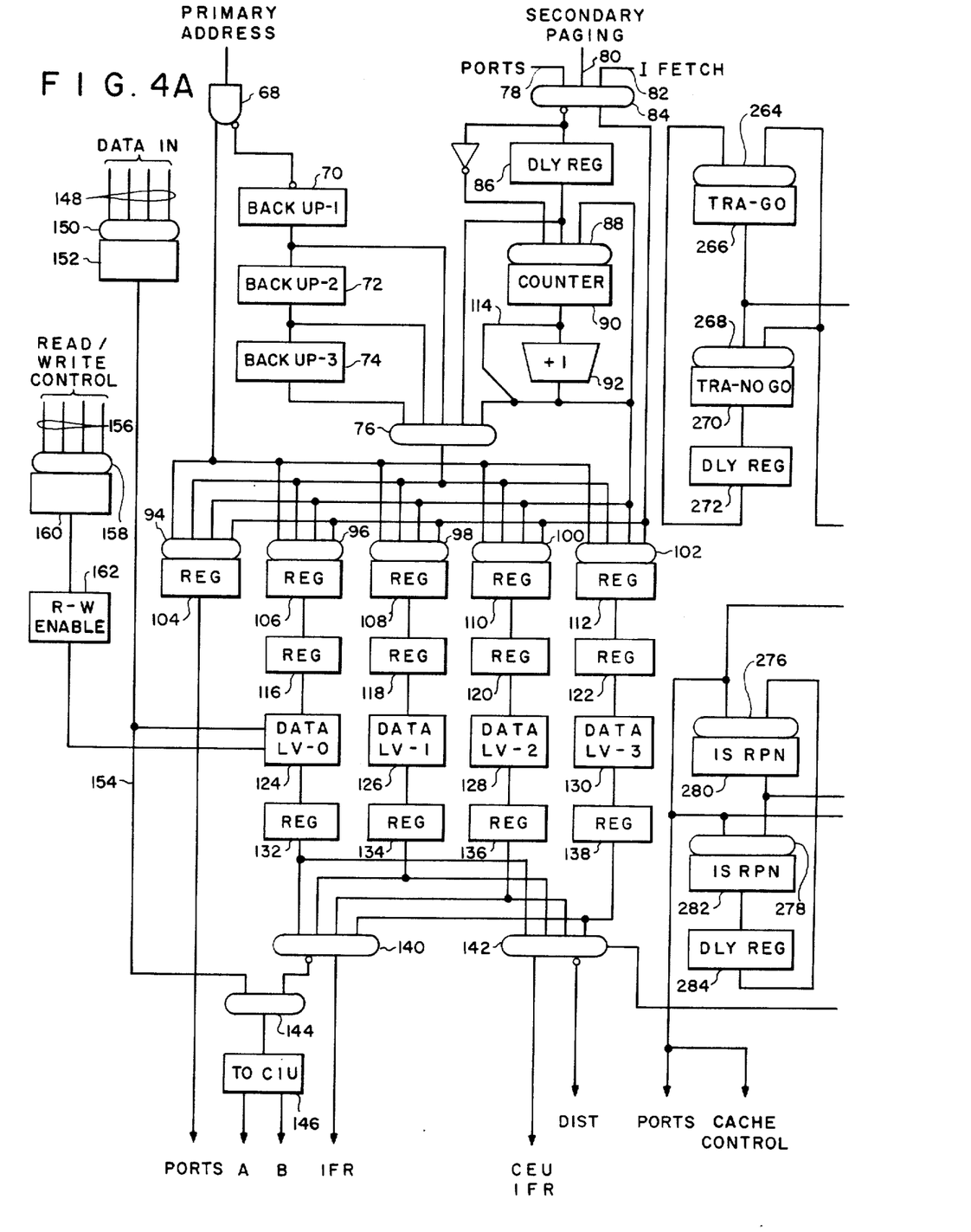
FIGS. 4A and 4B together comprise a detailed logic diagram of a cache memory unit shown in FIG. 3.
Figure 4B:
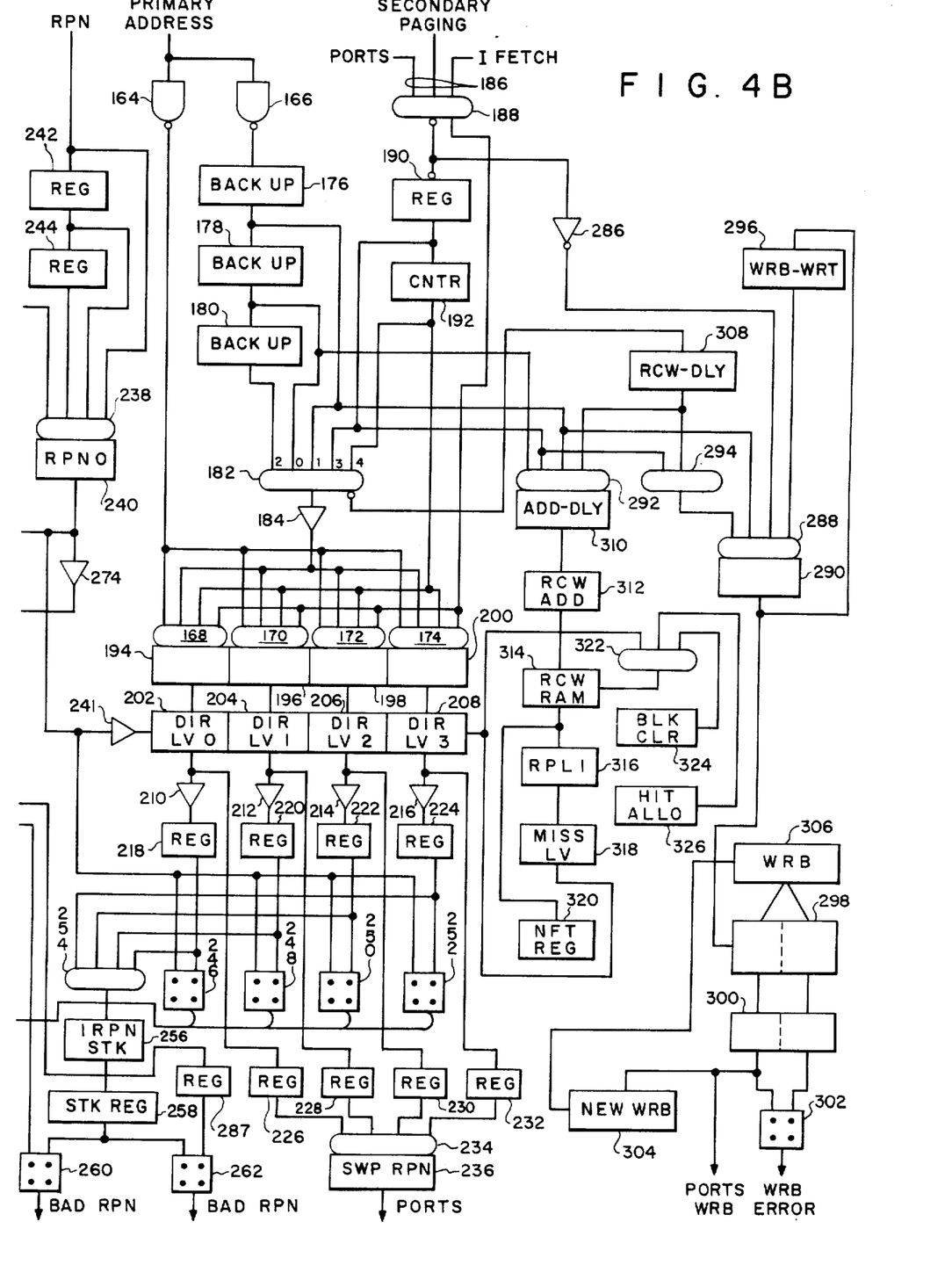

In FIG. 4, there is a detailed logic diagram of the functional elements of each of the cache memory units in accordance with the present invention, the I-cache and the O-cache being structurally identical. Primary address signals are applied to the input of a gating means 68. The gating means 68 is provided with a true and a complementary output. The true output is applied to one input of a signal distribution arrangement which will be discussed more fully hereinafter. The complementary output of the gating means 68 is applied to a backup stack comprising a set of three cascaded registers 70, 72 and 74. The output of each of the three backup register 70, 72 and 74 is applied as input to a selector switch 76.

A plurality of secondary input address signals are applied, respectively, to the three input connections 78, 80 and 82. The input signals represent, respectively, signals from the ports units 48 of the CPU, a paging signal, and an instruction fetch signal. These signals are applied to the input side of a selector switch 84. The selector switch 84 is provided with a true output and a complementary output. The true output is connected directly to the signal distribution network aforementioned. The complementary output is applied to a first counter or register 86 the output of which is connected through a selector switch 88 to the input of a second counter 90. The complementary output of the selector switch 84 is also applied through an inverter directly to the input of the selector 88, thence to the counter 90. The output of the counter 90 is applied first through an incrementing adder 92 the output of which is connected to a further input of the selector 76, directly to a further input of the distribution network, and, via a feedback, to the input of the selector 88. The output of the counter 86 is also applied directly to the input of the selector switch 76.

The signal distribution network hereinbefore mentioned includes, in the exemplary embodiment, five input selectors 94, 96, 98, 100 and 102, respectively. Each of the selectors 94–102 has its respective outputs connected to register means 104, 106, 108, 110 and 112, respectively. Each of the five input selectors 94–102 has four input connections with the individual input connections of each of the selectors connected to the corresponding input connection of the others of the five selectors. Thus, the true output of the gating means 68 is connected to a first input connection of all five of the input selectors 94–102. The output of the selector switch 76 is connected in common to the second input connection of the five input selectors. The output of the adder 92 and the output of the counter 90 by way of the bypass connection 114 are connected in common to the third input connection of each of the input selectors 94–102. The true output of the selector switch 84 is connected directly in common to the fourth input connection of the five selector switches 94–102. The output of the register 104 comprises a block number output for connection to the ports assembly 48 of the CPU. The output of the register 106 is connected to the input of an input register 116. The output of the register 108 is connected to the input of an input register 118. Similarly, the output of the register 110 and the output of the register 112 are connected, respectively, to the input of further input registers 120 and 122.

The input registers 116, 118, 120 and 122 comprise the input registers for the data array memory unit of the cache. The cache memory is established in four levels. In the exemplary embodiment, each level of the data array comprises RAM means of 1K×80 dimension. These levels are indicated as being four RAM memories 124, 126, 128 and 130, respectively. Each of the data array level units is provided with an output register 132, 134, 136, 138, respectively. The output of the register 132 is connected to a first input of each of two selector switch means 140 and 142, respectively. The output of the register 134 is applied to a second input of each of the two switch means 140 and 142. Similarly, the output of the registers 136 and 138 are applied, respectively, to a third and a fourth input of the selector switch means 140 and 142. The switch 140 is provided with a true output and a complementary output. The true output is connected to the instruction fetch register of the instruction fetch unit 26 illustrated in FIG. 2. The complementary output of the switch 140 is connected to one input of another selector switch 144. The output of the selector 144 is connected to a register 146. The register 146 is also provided with a true and a complementary output. The two outputs of the register 146 are connected, respectively, to the two CIU units 6 and 8 illustrated in FIG. 1.

Data input signals for the data array comprising the RAMS 124, 126, 128 and 130 is derived from one or more of a plurality of input connections 148. These input connections 148 are connected as input to a selector switch 150 the output of which is connected to a register 152. The output of the register 152 is applied as input to the data array RAMS 124, 126, 128 and 130. By way of a bypass lead 154, the output of the register 152 is applied directly to the second input of the selector 144 for transmission to one or the other of the CIU units by way of the register 146.

Control signals for controlling the read/write operation of the data array is applied from any of the several sources within the computer system to a plurality of input connections 156. Those connections are arranged as input to a selector 158 the output of which is connected to a register 160. The output of the register 160 as applied as input to an enable logic network 162. The enable logic network 162 is arranged to respond to the input signals in a manner to establish which level of the data array information is to be read from or written into.

Primary address information is also applied to a pair of gating members 164 and 166, respectively. The output of the gate 164 is applied to one input of a distribution network similar to that shown in connection with the data array. That is, the output of the gate 164 is connected in common to a first input terminal of each of four selectors 168, 170, 172 and 174. The output of the gate 166 is connected through a backup chain of three registers 176, 178 and 180. The output of the first register 176 is connected, in addition to the input to the second register 178, to an input teminal of a selector switch arrangement 182. The output of the second register 178, in addition to being connected to the input of the third register 180 is also connected to a further input of the selector 182. The output of the third register 180 is also connected to a third input of the selector 182. The selector 182 is provided with a true output and a complementary output. The true output is connected through an amplifier to a common connection to a second input of each of the four selectors 168, 170, 172 and 174.

As before, secondary address information is provided on one or more of three input connections 186 identified, respectively, as ports, paging, and I-fetch. These input connections are applied to the input of a selector switch arrangement 188. The switch 188 is provided with a true output and a complementary output. The complementary output is connected as input to a first register 190 the output of which is connected to a second register 192. The output of the first register 190 is connected to another input of the selector 182 while the output of the second register 192 is connected to still another input of the selector 182. Additionally, the output of the second register 192 is connected, in common, to a third input of each of the selectors 168, 170, 172 and 174. The true output of the selector 183 is connected directly, in common, to a fourth input of the four selectors, 168, 170, 172, and 174.

The output of the selectors 168, 170, 172 and 174 are connected, respectively, to the input of four registers 194, 196, 198 and 200. The registers 194, 196, 198 and 200 comprise input registers for the directory array of the cache assembly. As in the case of the data array, the directory array is also arranged in four levels represented by the four RAMS 202, 204, 206 and 208. In the exemplary embodiment of the present invention, each of these four RAMS comprises a 256×18 array. The output of each of the levels of the directory array is connected, respectively, through a driver amplifier 210, 212, 214 and 216, to a corresponding holding register 218, 220, 222, and 224. The output of the directory array levels are each connected, respectively, to an output register 226, 228, 230 and 232. The output of each of these registers is connected to separate inputs of a selector switch 234 the output of which is connected to an output register 236. The output of that register 236 is connected to the ports unit 48 of the CPU.

In correlating the activity of the cache with the main memory unit, a real page number is applied to the input connection RPN. That number is applied, first, directly to one input terminal of a selector switch member 238. The output of which is connected to a real page number register 240. The RPN is also applied to the input of a first register 242 the output of which is applied to the input of a second register 244. The output of the first register 242 is also connected to a separate input of the selector switch member 238. The output of the second register 244 is similarly connected to a third input connection of the switch member 238. The output of the RPN register 240 is applied through a first buffer amplifier 241 to a control input of the directory array comprised of the four RAMS 202, 204, 206 and 208. The output of the register 240 is also applied directly to one input of each of four comparators 246, 248, 250 and 252. The comparator 246 has its other input connected to the output of the register 218 to compare the real page number with the page number designation in the register 218. Similarly, the comparator 248 has its other input connected to the register 220, the comparator 250 has its other input connected to the register 222 and the comparator 252 has its other input connected to the register 224. The output of the comparators 246, 248, 250 and 252 are connected to control the selection effected by the selector 142. The output of each of the registers 218, 220, 222 and 224 is also connected, respectively, to four input connections of a selector switch member 254. The output of the selector switch 254 is connected to the input of an instruction real page number stack 256. An output from the stack 256 is applied as input to a stack register 258, the output of the stack register is applied to one input each of a pair of comparators 260 and 262, respectively.

The output of the real page number register 240, in addition to being applied to the directory array and the directory comparators, is also applied to one input of a selector switch 264 the output of which is applied to a register 266 labeled TRA GO. The output of the register 266 is applied first as a fourth input to the selector switch 238. Second, it is applied as one input of a selector switch 268, the output of which is connected to a register 270 labeled TRA NOGO. The second input of the selector switch 268 is connected also to the output of the RPNO register 240. The output of the register 270 is applied as input to a delay register 272, the output of which is connected in a loop-back to a second input of the selector switch 264.

The output of RPNO register 240 is also applied, through a buffer amplifier 274, to the input of a selector switch 276 and to an input of a selector 278. The output of the selector 276 is applied as input to a register 280 labeled ISRPN. The output of the register 280 is applied as a second input to the selector switch 278. The output of the selector switch 278 is applied as input to a register 282, the output of which is connected as input to a delay register 284. The output of the delay register 284 is applied in a feedback loop to second input of the selector switch 276. The output of the buffer amplifier 274 is, in addition, applied as an input signal to a register 287, the output of which is connected as a second input to the comparator 262. The output of the register 280 is applied as a second input to the comparator 260. Effectively the two comparators 260 and 262 compare the real page number supplied from externally of the cache memory unit with those obtained from the directory array. Such a comparison will detect a real page number which is not valid for the present cache.

The complementary output of the selector switch 188 is also applied through an inverting amplifier 286 to one input of a switch selector 288 the output of which is connected to the input of a register 290. The output of the backup register 176 is further connected as an input to a selector switch 292 and as a second input to the selector switch 288. The output of the register 190 is connected as a second input to the selector switch 292 and provides a first input to the selector switch 294. The output of the selector 294 is connected as a third input to the selector 288. The output of the register 290 is applied first as an input to a register 296 labeled WRB-WRT. The output of the register 296 is applied as a fourth input to the selector switch 288.

The output of the register 290 is applied to a control input of a RAM 298. The RAM 298 is, in the exemplary embodiment, a256×8 RAM for storing a written-bit code, more about which will be said hereinafter. The written-bit appears as a four-bit unit, consequently, the RAM 298 is divided into two four-bit sections. The left most section, as illustrated in FIG. 4 is arranged to accommodate the written-bits. The right hand portion of the RAM stores a duplicate of the data written into the left hand portion. This duplication is used, in the exemplary embodiment, as a check for the accuracy of the written-bit. An output from each half of the written-bit RAM 298 is applied as input to corresponding halves of a register 300. An output from each of the two halves of the register 300 is applied as two inputs to a comparator 302. The written-bit code from the left hand portion of the register 30 is also applied as input to a logic network 304 designated NEW WRB. The output of that logic network 304 is applied as input to a register 306 designated WRB. The output of the register 306 is applied simultaneously to both halves of the RAM 298. A written-bit is stored in the RAM 298 in a position corresponding to each block of data stored in the data array 124, 126, 128 and 130. In each level of the data array there is capacity for accommodating 256 blocks of data. There are four levels to the data array. Correspondingly, the written-bits are arranged in an array of 256×4 with each bit designating one block in each corresponding level of the array. In practice, the written-bits are set to designate that the associated cache is the "owner" of the data block. The output of the register 300 is also connected to the ports unit 48 of the CPU to convey the written-bit information to the ports unit.

A complementary output of the selector switch 182 is connected to an input of a delay register 308 labeled RCW-DLY. The output of the register 308 provides a second input connection to the selector switch 294 and a third input connection to the selector switch 292. A fourth input for the selector switch 292 is connected to the output of backup register 178. The output of the selector switch 292 is connected to the input of a register 310 labeled ADD DLY. The output of the register 310 is applied as input to an RCW ADD register 312. The output of the register 312 is applied as input to a RAM 314 designated RCW RAM. The RCW RAM is, in the exemplary embodiment, a 256×6 RAM wherein replacement code words are stored for keeping track of the least recently used data block in the data array of the cache. An output of the RAM 314 is applied as an input signal to a register 316 labeled RPLI the output of which is applied to the input of a register 318 labeled MISS LV. The output of the RAM 314 is also applied as input to a register 320 labeled NFT. The NFT register 320 is a part of the system to accommodate non-functional test operations. The output of the register 318 is applied as an input control signal to the directory array including the RAM levels 202, 204, 206 and 208. The same signal is also applied as one input signal to a selector switch 322. Additional input signals are applied to the selector switch 322 from a block clear logic unit 324 and a hit allocate logic unit 326. The output of the selector switch 322 is applied as a control signal to the RCW RAM 314.

Having thus described the structure of the dual cache and its environment, attention will now be given to the operation of the apparatus.

The I-cache, while identified as the instruction cache, is adapted to contain only unmodified instructions obtained from the main memory. In addition, the I-cache may contain indirect word blocks. The O-cache, on the other hand, is adapted to contain all operands, modified instructions, and modified indirect word blocks.

It is contemplated that the cache structure of the present invention will be used in a high speed computer system wherein more than one CPU may be involved and in which each of the CPUs include a plurality of execution units as discussed in connection with the description of FIG. 2. Inasmuch as more than one execution is involved and that the plurality of execution units may be simultaneously operative, the data and the instructions are presented in a pipeline configuration. To this end, the initial pipeline operation is established through the CUPS unit 24.

In a first instance, a request is made to the I-fetch unit 26 for an instruction. The I-fetch then addresses the I-cache to extract a first instruction. If that instruction is found in the I-cache, the instruction is read out, stored in the instruction stack in the I-fetch unit 26. In serial order the instructions are acquired by the central unit pipeline structure (CUPS 24) where the instruction information is manipulated and used to address the O-cache 22. Assuming that the requested information is stored in the O-cache, depending upon the instruction given, the data will be extracted from the O-cache 22 and transmitted either to the distributor 28 or directly to the CIU 6.

Referring the foregoing procedure to the structure shown on FIGS. 4 A and B, a primary request from the CUPS unit 24 is applied to the primary address input of the gate 68 and to the primary address input of the gate 164 and 166. The output from the gate 68 is applied as input to the distribution network including the selectors 96, 98, 100, and 102, as well as the selector 94. The output of the gate 68 is also applied to the input of the backup register 70. Similarly, the output signal from the gate 164 is applied as an input to the distribution network represented by the selectors 168, 170, 172, and 174. The primary request signal is also applied through the gate 166 to the backup register 176. The backup registers 70, 72, and 74 comprise a cascaded delay arrangement for holding the primary request address in the succession of registers in the event that there is an interference routine extent which would prevent the direct reading of the primary address into the registers 106, 108, 110 or 112. Similarly, the backup registers 176, 178, and 180 comprise a cascaded delay arrangement, again, to store the primary address signal in the event of an interference routine.

Inasmuch as the cache arrangements comprising the present invention may have more than one operation going on at the same time, a secondary routine, being a routine already in progress is deemed a noninterruptable routine, the primary routine will be considered as an interruptable routine because it is at its first stage of operation. Accordingly, in the event of an interfering routine, the primary request will be delayed through the backup registers 70, 72, and 74 in the data array and the backup registers 176, 178, and 180 in the directory array. Under the control of the primary control logic 56

(FIG. 3) the selectors 168, 170, 172 and 174 are actuated to drop the primary address from the gate 164 into each of the registers 194, 196, 198 and 200.

In the exemplary embodiment of the present invention, the primary request includes a 27 bit word, the first 16 bits of which represent an RPN or Real Page Number. While bits 15-22 represent a block number, bit 15 being overlapped in both numbers. The last three bits represent word and byte identification.

Thus in FIG. 4, the bits 1-15 are applied to the RPN input to the register 242. While bits 15-22 are applied to the primary address input of the directory array. Assuming no interference is present, the switches 168, 170, 172 and 174 gate the block number into the registers 194, 196, 198 and 200. These then simultaneously address all four levels 202, 204, 206 and 208 of the directory array. Each level will, of course, include a block address corresponding to the block address applied thereto. In each of those block addresses there will be a unique 16 bit RPN previously recorded therein as well as a parity-bit and a validity-bit. The RPN at the addressed block in each of four levels will be transmitted though the buffer amplifiers 210, 212, 214, and 216 to the registers 218, 220, 222 and 224. While the block number is being stepped through the directory array to the registers 218-224, the RPN is being stepped through the registers 242, 244, and gated into the register 240. The output of the register 240 is applied to one input of each of the four comparators 246, 248, 250 and 252. The outputs of the registers 218, 220, 222 and 224 are applied, respectively, to the other input of each of the four comparators 246-252. The same actual RPN will not be recorded in more than one level of the directory array. Thus, assuming a "hit", only one of the four comparators will produce a hit output signal.

While the appropriate signals have been stepped through the directory array and the comparators to produce a hit signal, bits 15-24 of the primary request were applied to the input of the gate 68 and were dropped into the registers 106, 108, 110 and 112. The same signals were then stepped into the registers 116, 118, 120 and 122. The address in the registers 116, 118, 120 and 122 is then used to address each of the four levels 124, 126, 128 and 130 of the data array. The information stored at the addressed locations in the four levels of the data array are loaded into the registers 132, 134, 136, and 138. The information stored in the registers 132, 134, 136, and 138 is then applied, respectively to the four input connections of the two switches 140 and 142. The operation of the cache, so far, is identical irrespective of whether the cache is the I-cache 20 or the O-cache 22. If the cache under consideration is an I-cache and the data extracted from the data array is an instruction, the switch 142 will be selectively activated to select that level output from the data array which corresponds to the level at which the hit was found in the directory. That selected instruction will then be delivered to the instruction fetch register in the fetch unit 26. The selector switch 140 is not used in the I-cache nor is the complementary output from the selector switch 142.

When the primary address is applied through the gate 166 it is loaded into the register 176. The output of the register 176, applied to the input of the switching selector 292 loads that primary address into the register 310. On the next clock cycle that address is loaded into the register 312 identified as an RCW address. Then on the next clock cycle that address is used to address the RCW RAM 314. The RCW RAM 314, as noted, is a 256×6 RAM with each of the 256 rows representing and corresponding, respectively, to the 256 block addresses in the directory for the 256 blocks in each level of the data array. The RCW RAM is updated with a replacement code word which indicates that the addressed block is the most recently addressed block in the cache. The RCW RAM 314 thus keeps track of which blocks in the cache have been most recently used and which have been least recently used.

If the primary address requested had not been present in the cache, the data would have been requested from the main memory unit. When thus retrieved, the requested data would then be loaded into the data array with the address loaded into the directory array. The particular address in the array where the new data will be stored is determined by the RCW RAM 314. The address of the least recently used row in the cache will be loaded into the register 316 then into the miss level decode register 318. The output from the register 318 will indicate the address and level of the block to be occupied by the newly retrieved data.

As was hereinbefore mentioned, in a computer system wherein more than one CPU is involved and has access to the same shared main memory unit, since each of the other CPUs will have its own cache memory system, the block of information from the main memory unit might be accessed by and stored in any one of several cache units. Since the data from the main memory unit may have been modified by any one of the CPUs and stored in its own cache unit, it is important that the current and most recently modified data be stored and available in only one of the several cache units. Therefore, when data is written into a cache unit such as the one illustrated in FIG. 4, the address of that information, applied to the primary address input through the gate 166 and the register 176, in addition to addressing the replacement code word RAM, is also applied, through a selector switch 294 and a selector switch 288, to the register 290. The output of that register 290 addresses WRB RAM 298.

The RAM 298 is, as was previously mentioned, a 256×8 RAM. It is divided into two identical segments of 256×4. One side being a redundant duplicate of the other side. In the RAM, there is stored a WRITTEN bit corresponding to each block address in the cache including the directory array and the data array. When data is written into an allocated block in the associated cache, the corresponding WRITTEN bit is set. The setting of the WRITTEN bit representing each particular block in the associated cache, indicates that the associated cache owns the latest updated version of the particular block of data.

If a store request is made of the cache and the requested block of data is found in the cache, that is a cache hit is accomplished, the written-bit RAM is also interrogated to assure that the data found in the cache is valid data, that is, that it is the latest version of that data. That is determined by ascertaining that the written bit for that block of data is set in the written bit RAM. If another control unit had previously requested that data, it would be lodged in the RAM of that other processor unit. When the data has been requested from the owner of the data, i.e., the illustrated cache, by another processor unit, the written bit corresponding to that address is reset in the illustrated cache. This indicates that the data still present in the present cache is valid data, but that data may be stored in another cache. Thus, when the cache is addressed and a store hit scored with the written bit not set, ownership is requisitioned from the system or if owned by another cache, than the addressed data is requested from the cache that is the owner of the latest version or revision of the data. This is accomplished through a control system not forming a part of the present invention. The requested data is supplied through the CIU 6 (FIG. 2) and the store stack 44 to the appropriate input of the cache. When the requested data is supplied to the cache, the written-bit and the valid-bit are set, while the written-bit and the valid-bit of the supplying cache are reset. Thus, the cache containing or "owning" the most recent modification of any block of data is identified.

With the cache being operated in a pipeline type of structure, it is possible for more than one operation to be in effect in any one cache at any given time. To this end, secondary signals may be applied to the input of the selector switch 84 in the data array or to the selector switch 188 in the directory array. For the most part, the simultaneous operations may be effected without interference with each other. On some occasions, however, there will be an interference between the two routines.

Inasmuch as the secondary procedures represent operations which have already begun, the secondary operations are given a priority over the primary operations. To this end, the primary address information in the data array is supplied to the backup stack registers represented by the registers 70, 72 and 74. Each of the three registers 70, 72 and 74 represent a one clock time delay. The output of each of the backup registers is connected, respectively, to an input of the selector switch 76 which may then be actuated to gate the appropriate address to the address distribution network. This provides up to a four-clock period delay of the primary request to allow the completion of a secondary operation in progress.

Similarly, in the directory array, the primary address is supplied through the gate 166 to the backup register stack represented by the registers 176, 178 and 180. Again, these registers 176, 178 and 180 provide up to four clock time delay of the primary address signal while a secondary operation in progress is completed.

In the event that the instruction being executed in the cache called for a transfer routine, sometimes referred to as a branch or jump routine, or if the request had been for an indirect addressing program, the corresponding instructions would be extracted from the cache and stored in the instruction stack register of the instruction fetch unit 26. The information stored in the instruction stack of the IFU 26 does not include the real page numbers, they use only the block address and the cache level number of the addressed information. As hereinbefore noted, the instructions stored in the instruction fetch unit are held until such time as they are called for by the operation of the selected routine. Inasmuch as other operations may be carried on simultaneously in the cache, it is possible for the data in an addressed location in the cache to have been withdrawn and/or moved by operation of such other routine in the interim between the time at which an instruction was stored in the instruction stack in the IFU 26 and the time that it is called for operation. If that should occur, when the changed location in the cache is addressed, the information stored therein will be wrong information for the particular routine. In order to avoid the use of such misinformation, whenever such instructions are withdrawn from cache and stored in the instruction stack of the I fetch unit, the RPN of that information is stored in the IRPN stack 256. That stack maintains a one-for-one store of the RPNs corresponding to the instructions stored in the instruction stack of the IFU 26. When the individual instruction is extracted from the stack of the IFU 26 to be executed, the RPN of the addressed location in the cache memory corresponding to the address of the instruction, is compared with the RPN for the current instruction sequence. Each time a transfer operation is indicated, the RPN of the transfer sequence is loaded into the register 266 and the register 280, as well as into the register 270 and 282. On the next clock cycle, the contents of the register 270 is loaded into the register 272 and the content of the register 266 included into the register 270. Similarly, the content of the register 282 is loaded into the register 284 and the content of the register 280 is loaded into the register 282. By that time, it will have been determined whether the transfer is a legitimate transfer, that is, whether it is a transfer GO or a transfer NO GO If it is, in fact, a transfer GO, the content of the register 272 is reloaded into the register 266 and there stored until called upon. Similarly, the content of the register 284 is reloaded into the register 280 and there stored until called upon. If the transfer is a NO GO, the content of the register 272 is dumped and lost. Similarly, if it is a NO GO, the content of the register 284 is dumped. Assuming a GO type transfer, the content of the register 280 represents the RPN of the current transfer sequence. It is that RPN that is compared in the comparator 260 with the corresponding RPN from the IRPN stack 256. If the two RPN numbers are identical, the indication is that the addressed data is proper data. If, on the other hand, the RPN numbers are different, the comparator output will so indicate and report a bad RPN. Under those circumstances, the CUPS will reject the addressed data and do a new fetch from the cache memory. Similarly, when the indicated routine is an indirect addressing program, the RPN is loaded into the register 287 and compared with the RPN from the IRPN stack 256 by operation of the comparator 262. Again, if the two RPNs agree, the output of the comparator so indicates. On the other hand, if the two RPNs do not agree then the output of the comparator 262 indicates a bad RPN number and again, the processor rejects the data.

In the event that the request had been for a cache read routine, and the required information was not in the designated cache, the system would record a cache miss. Upon such a miss, the required information would be extracted from the main memory or obtained from the cache of another control unit. The requested data would then be stored at an allocated position in the memory of the requesting cache. The allocated position would, of course, be determined by the replacement code word for that position stored in the RAM 314. If that position, albeit the least recently used word, contains valid information with the written bit for that word set, in order for that information to avoid being lost, it is swapped out to be restored in the main memory. To that end, the RPN stored in the allocated directory level is loaded into the appropriate one of the registers 226, 228, 230 and 232 to identify the address of data being retransmitted to main memory the data stored at the corresponding location the data array will be shifted respectively through the registers 132, 134, 136 and selectively through the register 146 to the CIU for transmission to the main memory. The new data and RPN may then be shifted into the location allocated in the cache. If, on the other hand, the data stored at the allocated position is not indicated as being valid information, valid-bit reset, nor does it have the written-bit set, then the new data will be stored into the allocated position replacing the old data without the old data being transmitted back to memory. The reason for that being that, if the written-bit is not set, then the information stored at the allocated position is unmodified information and the correct information is already stored in the main memory. If the information stored at that location is not indicated as being valid, then the correct information is stored in the cache of a different control unit. That being the case, there is no need to transfer the invalid data back to the memory.

As was noted hereinbefore, the cache of the present invention is characterized as being suitable for inclusion in a multiple processor system wherein each of the processors has access to the data in a sheared main memory. When data that has been requested or addressed by a different control unit is presently owned by the illustrated cache, that information is requested from the illustrated cache on a routine which has been identified as a siphon routine. If the request from the other processor was based on a "read" request, then the siphon routine effectively transfers the data to the cache of the other processor and resets the written bit of the supplying cache; the valid-bit of the supplying cache remains set. Under those conditions, if a "read" request for that data were to be imposed on the supplying cache, the data could still be read therefrom. On the other hand, if the request from the processor had been based on a "read, modify, rewrite" request, then the siphon routine would include a "clear" instruction for the supplying cache. The latter routine resets the valid bit of the supplying cache, updates the RCW RAM, resets the written bit, and transfers the data to the requesting cache. The siphon request is applied to the illustrated cache through the ports input of the secondary data access connections in both the directory and the data array. Since only the O-cache is allowed to contain modified data, it is only the O-cache which is subjected to being siphoned. When data is siphoned from one cache to another, it is, in the exemplary embodiment, an eight-word block, that is siphoned. In the data array, the request signal is applied through the ports input 78 to the selector switch 84 and frome thence through the inverter to the selector switch 88 and into the counter register 40. The output of the counter 90 is applied by way of the bypass 114 to an input of the selector 76. That selector is activated by the secondary control circuit illustrated in FIG. 3, to address the selected level of the data array 124, 126, 128 or 130. Since, in the illustrated embodiment, each level of the data array has at each row thereof two data words of 40 bits each, the two data words are transmitted to the requesting CIU by way of the register 146. In the meantime, the counter 90 will have been incremented by one by the adder 192. The counter 90 will then again transmit the incremented address to the corresponding level of the data array and extract the next two words for transmission to the requesting CIU. The incrementing will continue until all eight words of the block have been extracted from the selected level of the data array and transmitted to the CIU. In the directory, each row of each level of the directory array represents one eight-word block of information stored in the corresponding location in the data array. Consequently, the siphon request applied to the port input connection at the input of the selector 188 is loaded into the register 190 and thence through the selector 182 to the designated level of the directory array to reset the valid-bit of the addressed block if a CLEAR is indicated. The output of the register 190 is also applied to the input of the selector 192 and from thence to the RCW RAM to place that block location in the data and directory array at the top of the availability list for replacement words. The same output of the register 190 is also applied through the selector 294 and the selector 288 to effect a resetting of the written-bit in the RAM 298 to indicate that that block of data is no longer owned by the present cache.

Under startup conditions for the CPU and in the event, during operation, the CPU is detected as having malfunctioned, the entire cache is cleared or, flushed. Under startup conditions, there should be no valid data in the cache. When the cache is flushed as a result of a CPU malfunction, however, valid data in the cache will be the only location of such data. Consequently, when the cache is flushed following a detection of a CPU malfunction, a part of the routine for flushing the cache is to transfer or "swap" the valid data back to the main memory.

The flush request is applied to the cache at the data array and the directory array ports input connections and loaded, respectively, into the delay registers 86 and 190. Under the control of the control logic unit 56 (FIG. 3), the request is loaded from the counter 86 through the selector 88 into the counter 90 and, from the register 190 into the register 192. As with a CLEAR routine, the first block in the directory array is addressed and examined for validity while the written-bit array is examined for the ownership of modified data by the cache. If valid and owned data is found at the addressed location in the cache memory, that data is extracted and returned to the appropriate address in the main memory. When all four pairs of words in such a data block have been returned to memory, the valid-bit and the written-bit for that block are reset. If no such data were found at the addressed block location then the valid-bit at the written-bit would have already been set to zero or reset.

In the extraction of the data from a valid and owned data block, the words are again extracted two at a time until all eight words have been extracted. This is accomplished under the control of the counter 90 and the associated adder 92 under the control of the main control unit 56 of the cache. When the four pairs of words have been cleared, the counter 192 is indexed by the main control unit 56 to identify the next block location in the directory. The procedure is then repeated until all 256 blocks have been cleared from the cache memory with the validity indicators and the written-bits reset. Thus if any valid and owned modified data had been stored in the cache, that data would be saved by returning it to the main memory to prevent its loss by malfunctioning of the CPU.

As was previously discussed, a number of operations can be effected simultaneously within the cache arrangement since each of the O-cache and I-cache can be separately addressed, and in each of those caches there may be primary and secondary operations being effected simultaneously. Since there are a number of such operations which may be effected in the two cache elements, not all of them may be carried out simultaneously. Accordingly, it is necessary to prioritize the secondary operations for each of the O-cache and the I-cache. To this end, the secondary control unit of the main cache controller 56 illustrated in FIG. 3 includes a simple priority circuit for effecting the prioritization of the several functions in each of the two cache units. In the O-cache, the primary access to the cache is the request for operands or instructions stored in the O-cache which requests are issued from the central unit pipeline structure 24 of FIG. 2. The secondary operations of the O-cache are, in their order of priority, in accordance with the present invention:

(1) Clearing a cache level.

(2) A siphon operation wherein data is extracted from one cache for transfer to the cache of another control element:

(3) The allocation of a new entry into the subject cache.

(4) A paging routine wherein a page table word is sought in the cache for correlating a virtual address with a real address in the page table.

(5) A store bypass routine wherein information transmitted through the ports input of the secondary access connections is transmitted by way of the selector 94 and the register 104 directly to the ports output without the delay of storing the data in the cache memory.

(6) A store operation wherein information for storage may be derived from either of two sources, i.e., from an external source by way of the CIU or from an internal source as from the store stack 44 of the CPU shown in FIG. 2.

(7) An instruction fetch originated in the instruction fetch unit 26 of FIG. 2 which activity is in the nature of a prefetch of instructions from the O-cache for stacking in the instruction stack register of the I-fetch unit 26. In the I-cache, the primary access is only used for an instruction fetch by the CUPS unit 24. There are no operands stored in the I-cache. The secondary access to the I-cache is prioritized in the following order.

(1) The first or highest priority is given to clearing the memory as in a swap, or a flush routine.

(2) An allocation routine for the allocation of space for the storage of new data in the cache.

(3) A storage update of the instructions stored in the I-cache which instructions are obtained from the main memory by way of the CIU and through the store stack 44 of the CPU.

(4) Again the I-fetch routine for fetching instructions from the cache for insertion into the instruction stack of the instruction fetch unit 26.

By so prioritizing the secondary operations of the I-cache and the O-cache, conflicts in operations are avoided and the inadvertent accessing of improper information in either cache is similarly avoided by the aforementioned priorities.

Thus there has been provided, in accordance with the present invention, an improved cache memory arrangement for digital data processors which features improved versatility of operation and which provides an improved data handling capacity.

The embodiments of the invention in which an exclusive property or privilege is claimed are defined as follows.

1. In a computer system, having a central processing unit (CPU) and further wherein the CPU includes a plurality of execution units, the computer system including a main memory and at least one cache memory, the cache memory comprising:

(a) a first input gate means for receiving a primary address;

(b) a first distribution network means, having a plurality of registers, said first distribution network means operatively connected to said first input gate means, for distributing said primary address among said plurality of registers to temporarily hold said primary address;

(c) first memory means organized to have a plurality of levels, operatively connected to said first distribution network means, for storing data in a plurality of blocks of a predetermined number of data words each level of the stored data being read simultaneously corresponding to the address being held in the corresponding register of said first distribution network means;

(d) switch means, operatively connected to each of said levels of said first memory means, for selecting one of the data words output from said levels, in response to a control signal;

(e) first backup register means, operatively connected to said first input gate means and operatively connected to said first distribution network means, for providing a delayed primary address to said first distribution network means;

(f) second input gate means for receiving said primary address;

(g) second distribution network means, having a plurality of registers, said second distribution network means operatively connected to said second input gate means, for distributing said primary address among said plurality of registers of said second distribution network means to temporarily hold said primary address;

(h) second memory means organized to have a plurality of levels, said levels of said second memory means corresponding to said levels of said first memory means, said second memory means operatively connected to said second distribution network means, for storing directory data, said directory data corresponding by level to the block of predetermined data words of said first memory means each level of said second memory means being read simultaneously corresponding to the address being held in the corresponding register of said second distribution network means;

(i) input register means, having an input terminal adapted to receive a real page number portion of said primary address, for temporarily storing said real page number;

(j) comparator means, operatively connected to said input register means and operatively connected to said second memory means, for comparing the real page number from said input register to the real page numbers outputted from each level of said second memory means to generate said control signal for said switch means; and (k) second backup register means, operatively connected to said second input gate means and operatively connected to said second distribution network means, for providing a delayed primary address to said second distribution network means.

2. A cache memory according to claim 1, further comprising:

(a) first register means, operatively connected to said second input gate means, for temporarily storing said primary address;

(b) third memory means, operatively connected to said register means, for storing replacement code words, said replacement code words corresponding to the directory data and indicating which one of the plurality of blocks of the predetermined number of data words of said first memory means is most recently addressed; and (c) second register means, operatively connected to said third memory means and operatively connected to said second memory means, for storing an address of said second memory means, the address of said second memory means being the least recently used block of predetermined data words of said first memory means.

3. A cache memory according to claim 2, further comprising:
(a) transfer register means, operatively connected to said input register means, for receiving the real page number in response to a control signal indicating that a transfer operation is being considered, to temporarily hold the real page number until it is determined that the transfer operation will be performed;
(b) instruction stack means, operatively connected to said second memory means, for storing the real page numbers of the data read from the first memory means and outputted from said switch means; and
(c) transfer comparator means, operatively connected to said transfer register means and operatively connected to said instruction stack means, for comparing the real page number of the address of the current transfer sequence to the corresponding real page number from the instruction stack means to generate a control signal indicating whether the addressed data is the proper data.

4. A cache memory according to claim 1, wherein said cache memory can be accessed by at least one other CPU (second CPU), said cache memory further comprising:
(a) input means, for receiving a secondary address from said second CPU;
(b) second switch means, interposed between said first backup register means and said input means, for selecting between said primary address of said first backup register means and said secondary address from said input means in response to a select control signal;
(c) second input means for receiving the secondary address from said second CPU; and
(d) third switch means, interposed between said second backup register means and said second input means, for selecting between the primary address of said second backup register means and said secondary address from said second input means in response to the select control signal.

* * * * *